(12) United States Patent  
Hadas et al.

(10) Patent No.: US 10,114,570 B2
(45) Date of Patent: Oct. 30, 2018

(54) DELETING DISKS WHILE MAINTAINING SNAPSHOT CONSISTENCY IN A VIRTUALIZED DATA-CENTER

(71) Applicant: Red Hat Israel, Ltd., Ra'anana (IL)

(72) Inventors: Arik Hadas, Ra'anana (IL); Liron Aravot, Ra'anana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/418,273

(22) Filed: Jan. 27, 2017

(65) Prior Publication Data

US 2018/0217765 A1    Aug. 2, 2018

(51) Int. Cl.
| | |
|---|---|
| *G06F 12/00* | (2006.01) |
| *G06F 3/06* | (2006.01) |
| *G06F 9/455* | (2018.01) |
| *G06F 13/00* | (2006.01) |
| *G06F 13/28* | (2006.01) |

(52) U.S. Cl.
CPC .......... *G06F 3/0619* (2013.01); *G06F 3/0665* (2013.01); *G06F 3/0689* (2013.01); *G06F 9/45558* (2013.01); *G06F 2009/45583* (2013.01)

(58) Field of Classification Search
CPC .... G06F 3/0619; G06F 3/0689; G06F 3/0665; G06F 9/45558; G06F 1009/45583
See application file for complete search history.

(56) References Cited

U.S. PATENT DOCUMENTS

| | | | |
|---|---|---|---|
| 8,180,984 B1 * | 5/2012 | Per | G06F 11/1451 707/641 |
| 8,805,788 B2 | 8/2014 | Gross, IV et al. | |
| 9,037,621 B2 | 5/2015 | Hutchins et al. | |
| 9,104,331 B2 | 8/2015 | Hsu et al. | |
| 9,116,726 B2 | 8/2015 | Shaikh et al. | |
| 9,116,737 B2 | 8/2015 | Aswathanarayana et al. | |
| 9,389,800 B1 | 7/2016 | Natanzon et al. | |
| 2010/0049929 A1 * | 2/2010 | Nagarkar | G06F 9/45533 711/162 |
| 2016/0203013 A1 | 7/2016 | Bayapuneni et al. | |

OTHER PUBLICATIONS

Cormac, "Virtual Volumes—A new way of doing snapshots", CormacHogan.com, Mar. 10, 2015, 11 pages.
Hewlett Packard Enterprise, "HPE 3PAR Virtual Copy Snapshots and Copy data management", Apr. 2016, 31 pages.
John Savill, "Q. I'm deleting a Hyper-V virutal machine (VM) that had snapshots. Why is the VM delete taking so long?", Oct. 8, 2008, 3 pages (http://windowsitpro.com/virtualization).

* cited by examiner

*Primary Examiner* — Mark A Giardino, Jr.
(74) *Attorney, Agent, or Firm* — Lowenstein Sandler LLP (57) ABSTRACT

An implementation of the disclosure provides a system comprising a memory to store disk images and a processing device, operatively coupled to the memory. The processing device is to identify a first disk image comprising a volume chain. Each volume in the volume chain comprises a respective metadata file. The identified first disk image is to be deleted from a virtual machine (VM). Responsive to identifying the first disk image, a second disk image associated with the VM is generated. One or more volumes in the volume chain of the first disk image are isolated from an active volume associated with the VM. The isolated volumes from the first disk image are moved to the second disk image by updating the metadata file associated with each of the isolated volumes. Thereupon, the first disk image is deleted from the VM.

20 Claims, 6 Drawing Sheets

DELETING DISKS WHILE MAINTAINING SNAPSHOT CONSISTENCY IN A VIRTUALIZED DATA-CENTER

TECHNICAL FIELD

The disclosure is generally related to virtualized computer systems, and is more specifically related to deleting disks while maintaining snapshot consistency in a virtualized data-center.

BACKGROUND

The virtualization of a data center results in an abstraction of a physical system to consolidate the data center infrastructure and increase operational efficiencies. A virtual machine (VM) may be a software-based emulation of computer hardware. For example, the VM may operate based on computer architecture and functions of computer hardware resources associated with hard disks or other such memory.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

A virtualized data center may include a plurality of host computer systems managed by a virtualization manager. Each host computer system (also referred to herein as a "host machine") may be communicatively coupled, via a network, to one or more storage domains that store disk images of a virtual machine (VM). "Data Storage domain" herein refers to an atomic storage unit, such as a mount point or a folder for a file based storage, or a group of logical unit numbers (LUNs) for a block-based storage. A data storage domain may comprise one or more block devices, one or more storage devices, one or more file systems, one or more volumes, and/or portions thereof. The data storage domains may be employed for storing one or more of the virtual disks or disk images for the VMs.

The VM may emulate a physical computing environment of the host machine. In some implementations, the VMs on each host computer system may be executed by a host management system, such as a hypervisor, that is in communication with a virtualization manager via the network. In this regard, the virtualization manager handles requests from the VM for a hard disk or memory of the host machine by translating these requests to the underlying physical computing hardware resources. This type of virtualization results in multiple VMs sharing physical resources.

Each VM may utilize one or more virtual (I/O) devices referred to as virtual disks. A virtual disk is based on a disk image (also referred to as a virtual disk image) stored on a psychical storage device of the host machine. The disk image may be represented by a volume chain comprising one or more volumes, which may also be referred to as "layers". Each volume or layer represents the disk image at a certain point in time (e.g., snapshot) that allows for a recovery the disk image state as it existed at the time the snapshot was taken. From the perspective of a virtual machine, these volumes appear as a single disk image, as the hypervisor presents the virtual disk to a virtual machine and implements the associated disk read-write operations.

Initially, a disk image may only comprise one raw volume, which may be made read-only before the first boot of the virtual machine. In some implementations, the virtualization manager may trigger adding a new volume ("layer") to the volume chain. The newly created volume may be made writable, and may only store disk blocks or files which have been modified or newly created by the virtual machine after the previous volume ("layer") has been made read-only. One or more volumes may be added to the volume chain during the lifetime of the virtual disk. Adding a new volume may be triggered by making the previous volume read-only (e.g., responsive to receiving a command via an administrative interface).

The above described layered disk image structure may be utilized for creating virtual machine snapshots. A virtual machine snapshot may be viewed as a storage function allowing creation of a restore point of a virtual machine's operating system, applications, and data at a certain point in time. A snapshot saves the data currently present in a virtual machine disk image as a read-only volume and allows for a recovery to the disk image state as it existed at the time the snapshot was taken. The snapshots can be used in several ways. For example, the virtualization manager may use the snapshots to return to an older snapshot of the virtual machine (e.g., to return to the state of the VM at a particular point in time). In other situations, the snapshots may be used to review or analyze the VM using the state at the time the snapshot was taken.

In some situations, the virtualization manager may delete one or more of the disk images associated with a VM. For example, a disk image may be deleted in response to a user request (e.g., system administrator or client user) because it is no longer used by the VM. When the disk image is deleted from the VM, the volumes associated with that disk image are also removed. However, if the disk image is deleted, the snapshot validity and consistency of the VM may fail, for example, if the VM state is ever restored using one of the snapshots that had an image of a disk (e.g., after creation of the snapshot) deleted. For example, in a particular snapshot of the VM, an installed operating system in the VM may have used the disk image (e.g., read from the disk or mount the disk), which may cause a system error or crash when the OS attempts to use that disk snapshot because the OS may fail to boot properly if it does not have access to that device.

In some situations, the system may be prevented from deleting the disk image while it is associated with a VM snapshot. This may adversely limit the system and prevent a needed rollback because the system may have to delete all of the snapshots associated with the VM before any disks can be deleted.

Implementations of the disclosure allow deleting a disk image associated with a VM while still maintaining the VM's snapshot consistency. In some implementations, the virtualization manager of the virtualized data-center may execute a worker host process to provide the benefits of the techniques disclosed herein. In some implementations, when the virtualization manager attempts to delete a disk image that is associated with a VM, the host process of the virtualization manager creates an empty disk image and marks it as attached to the virtual machine associated with the original disk image to be deleted. The worker host process iterates over volumes in the volume chain of the disk image to determine which volumes are associated with a snapshot of the VM. Then, the host process isolates the snapshot volumes from a currently active volume associated with the VM (which is not part of the snapshot). The currently active volume may be a newly created volume that is currently writable.

At this point, the worker host process may delete the original disk image from the VM. For example, the worker host may send a request to the virtualization manager to release or un-map a unique identifier for the original disk image from the VM. Thereafter, the virtualization manager may reassign the unique identifier for the original disk image to a different VM.

In some implementations, the worker host process may move the snapshot volumes from the original disk image to the empty disk image. In this regard, data associated with the snapshot volumes is not moved or copied to the empty disk image. Rather, the snapshot volumes are moved by changing each volume's identifier to an identifier associated with the empty disk image. For example, the worker host process may update the identifier in a metadata file for each of the snapshot volumes by assigning it a new identifier associated with the empty disk image. The host process then iterates over one or more VM configuration files associated with each the snapshot volumes to point each to the empty disk image assigned to the corresponding snapshot volumes.

If the VM is running at the time of the snapshot, the snapshot may also contain a state of the volatile memory associated with the VM. For example, in some implementations this volatile memory state may be saved in a separate disk image that is associated with the snapshot. In order to restore the volatile memory in the snapshot, the hypervisor is to be provided with the exact same VM configuration from the OS point-of-view as it was at the time of the snapshot. In some implementations, this configuration is saved in a separate disk image associated with the snapshot. In some implementations, the worker host process may update the identifier in a metadata file for each of the snapshot volumes by assigning it a new identifier associated with the empty disk image. For example, if a disk A with 3 volumes A1, A2, A3 (where A3 is the current active volume) is to be deleted and A2 was the active volume at the time snapshot S with memory is taken. When A is being removed, volume A3 is removed and new disk B is created, A1 becomes B1 and A2 becomes B2. In the VM configuration of snapshot S the configuration of disk A points to volume A2. In such cases, the worker host process modifies the VM configuration so the configuration of disk A will point to volume B2 instead.

Figure 1:
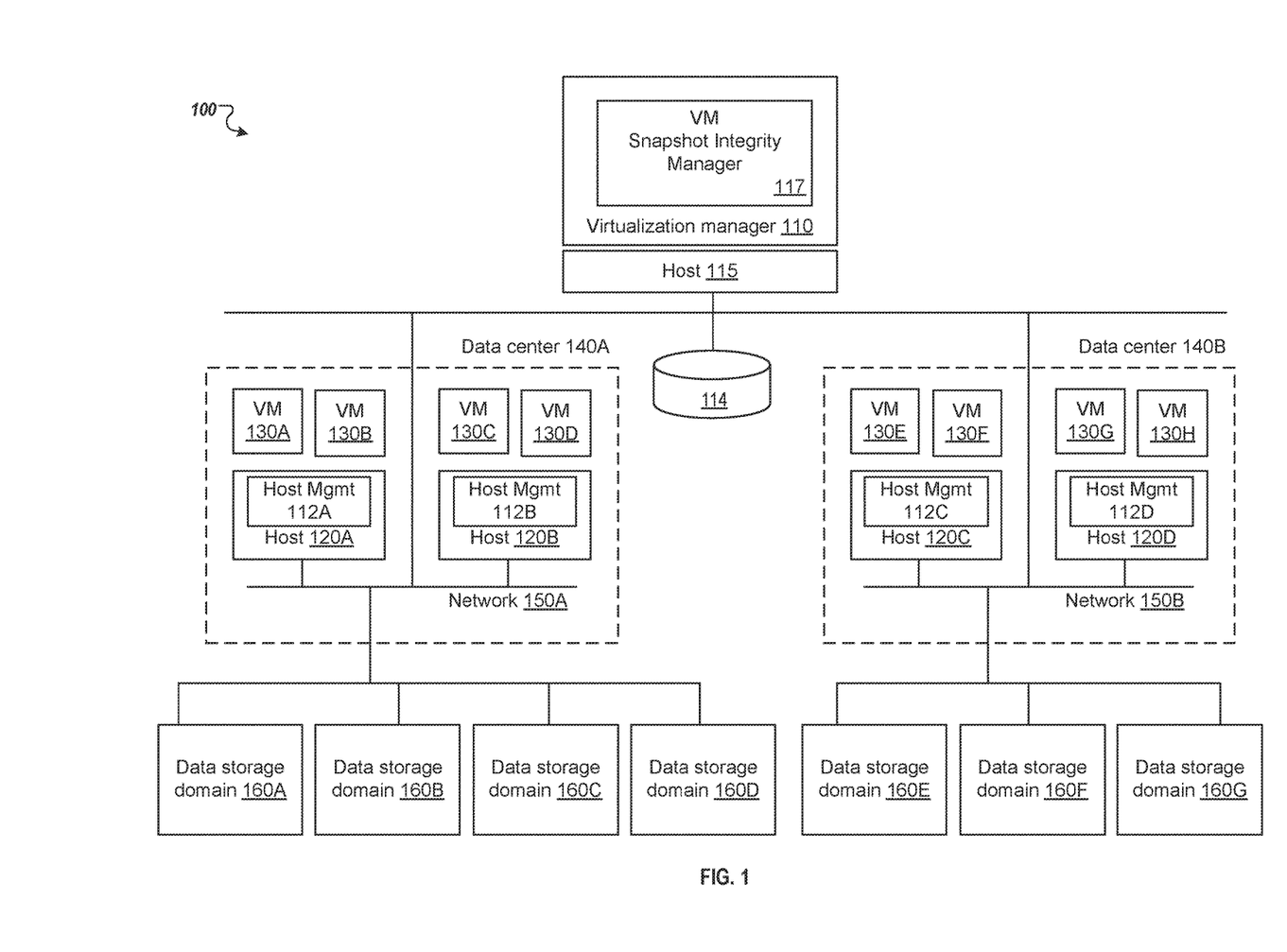
FIG. 1 is a block diagram of a distributed computer system representing a virtualized environment in which implementations of the disclosure may operate.

FIG. 1 is a block diagram of a distributed computer system 100 representing a virtualized environment in which implementations of the disclosure may operate. In the illustrative example of FIG. 1, computer system 100 comprises a virtualization manager 110 and a plurality of host computer systems 120A-120D grouped into one or more logical groups which may be also referred to as "data centers" 140A-140B. Virtualization manager 110 refers to one or more software modules being executed by a host computer system 115 for centralized management of the virtualized environment. Virtualization manager 110 may comprise various interfaces, including administrative interface, reporting interface, and/or application programming interface (API) to communicate to host computers 120A-120D of the managed virtualized environment, as well as to user portals, directory servers and various other components which are omitted from FIG. 1 for clarity.

In one implantation, the virtualization manager 110 may access a database 114, which may run on the host computer system 115 or in a separate database server (not shown). Database 114 may, e.g., be a relational database, an object-oriented database, an object-relational database, etc. The database 114 may store data, e.g., configurations, settings, and status related to VM host computer systems 120A-120D and references (e.g., IP addresses) of the data storage domains 160A-160G as well as other relevant information.

Each of the host computer systems 115, 120A-120D may comprise one or more processors communicatively coupled to memory devices and input/output (I/O) devices, as described in more details herein below with references to FIG. 6. Each of host computer systems 115, 120A-120D may run a plurality of virtual machines 130A-130H, by executing a hypervisor to abstract the physical layer, including processors, memory, and I/O devices, and present this abstraction to the virtual machines as virtual devices.

Each of the virtual machines 130A-130H may execute a guest operating system which may utilize the underlying virtual devices, including virtual processors, virtual memory, and virtual I/O devices. One or more applications may be running on the virtual machines 130A-130H under the guest operating system.

Each of the host computer systems 120A-120D may run a host management module 112A-D that manages and monitors various aspects of the host operation, including the storage, memory and network interfaces. In an illustrative example, host management modules 112A-D may be provided by a Virtual Desktop and Server Management (VDSM) daemon.

In certain implementations, host computer systems 120A-120D may be grouped into one or more logical groups which may be also referred to as "data centers" 140A-140B. A data center may represent the highest level of abstraction in the virtualization model. Each data center 140 may be communicatively coupled, via a network 150A-150B, to one or more storage domains, including data storage domains 160A-160G. The data storage domains 160A-160G may store disk images (not shown) of virtual machines 130A-130H. In some situations, the virtualization manager 110 may receive a request to one or more of the disk images associated with the virtual machines 130A-130H. For example, one or more of the disk images may be deleted so that the storage space associated with the disks can be reclaimed by the system 100.

In accordance with one or more aspects of the disclosure, virtualization manager 110 may comprise a host worker process, such as VM snapshot integrity manager 117, to facilitate operations of the computer system 100 to support the deletion of virtual disks while maintaining snapshot consistency. The functionally of the VM snapshot integrity manager 117 can exist in a fewer or greater number of modules than what is shown, with such modules residing at one or more processing devices of computer system 100, which may be geographically dispersed. The VM snapshot integrity manager 117 may be operable in conjunction with virtualization manager 110 from which it may receive and determine relevant information regarding the virtual disks and any virtual machines 130A-130H associated with the data storage domains 160A-160G in the virtualized datacenter as discussed in more detail below.

Figure 2:
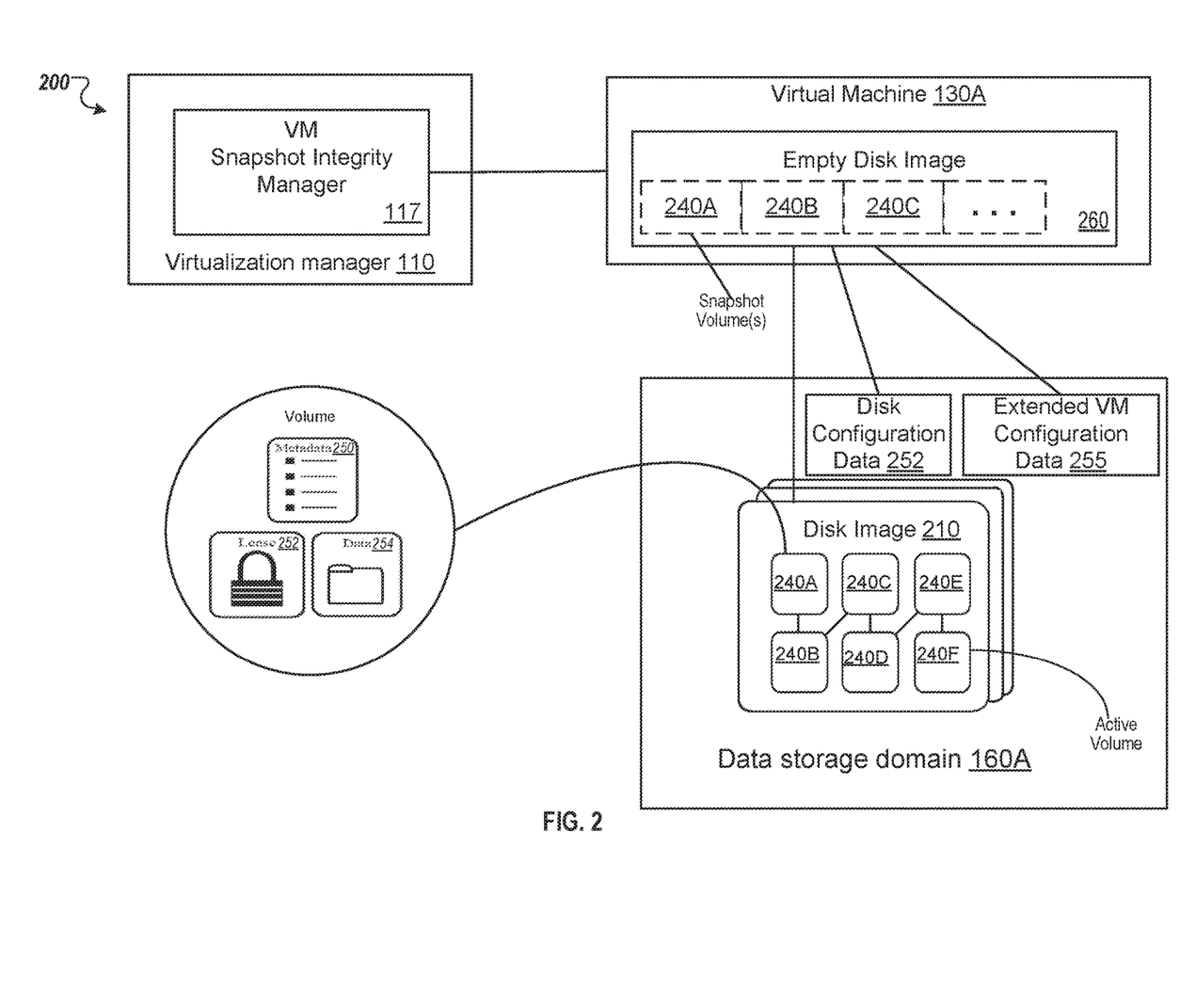
FIG. 2 illustrates an example functional a system for deleting disks while maintaining snapshot consistency in a virtualized data-center in according to an implementation of the disclosure.

FIG. 2 illustrates an example functional a system 200 according to an implementation of the disclosure. The system 200 may be employed for storing one or more virtual machine disk images, such as disk image 210 on a storage device, such as the data storage domain 160A for FIG. 1. In an illustrative example, the storage domain 160A may employ file-based storage, in which case disk images 210, metadata 250, and lease 254, and data 254, are provided by respective files. In another illustrative example, example storage domain 160A may employ block-based storage, in which case disk images 210, metadata 250, lease 252, and data 254, are provided by respective logical volumes.

Each disk image 210 (also referred to as a virtual disk) may comprise one or more volumes 240A-240F, as schematically illustrated by FIG. 1, for storing relevant data, such as metadata 250, lease 252, and data 254. In an illustrative example, a disk image 210 may represent a volume chain comprising one or more copy-on-write (COW) volumes (which may also be referred to as "layers") associated with a virtual machine, such as virtual machine 130A. From the perspective of the virtual machine 130A, these volumes 240A-240F appear as a single disk image. The virtualization manager 110 presents the disk image 210 as a virtual disk to the virtual machine 130A and implements the associated disk read-write operations. The virtual disk implemented by the virtualization manager 110 locates the data in the disk image 210 by accessing, transparently to the virtual machine 130A, each volume of the volume chain 240A-240F, starting from the most recently added volume. Although for simplicity, a single volume chain 240A-240F is depicted in FIG. 1, in some implementations, the shared storage domain 160A may store a plurality of volume chains (e.g., for each of a plurality of VMs, etc.).

In some implementations, each volume, such as volume 240A, in the volume chain 240A-240F may comprise a metadata file 250 that stores information about the volume, a lease file 254 that controls access to that volume and one or more data files 252 that stores data for the volume. In one implementation, information contained in the metadata file 250 includes references to associated volumes (e.g., to parent or child volumes in a copy-on-write chain) as well as data enabling the identification, management, creation, modification, removal, etc. of the volume.

In one example, lease file 252 provides a decentralized locking facility to prevent conflicting access to the same volume. For example, virtual machine 160A by obtaining a lease (also known as a lock) to a volume from the virtualization manager 110. The virtualization manager 110 makes a notation of a state of the lease in the lease file 254 of that volume. In this way, the virtual machine 160A receives exclusive access to the volume that would prevent other VMs from accessing the volume while the lease is active. In some implementations, the lease may have a certain expiration period, potentially extendable by a request from the VM.

In some implementations, the volumes 240A-240F may be utilized for creating snapshots of the virtual machine 160A. A virtual machine snapshot may be viewed as a storage function allowing creation of a restore point of a virtual machine's operating system, applications, and data at a certain point in time. For example, one or more of the volumes 240A-240F are used to save a snapshot of data currently present in the virtual machine 130A as a read-only volume and allows for a recovery of the virtual machine 130A to the disk image state as it existed at the time the snapshot was taken.

One or more of the disk images (e.g., disk image 210) that stores the volumes, in some implementations, may be deleted by the vitalization manager 110, for example, to reclaim storage space on the storage domain 160A associated with the disk. In such cases, the system 200 implements a VM snapshot integrity manager 117 that ensures the consistency and validity of the snapshots associated with the virtual machine 130A.

Upon identifying the request to delete a disk, the VM snapshot integrity manager 117 sends a request to the virtualization manager 110 to generate an empty disk image 260 that is used as a placeholder. The snapshot integrity manager 117 iterates over the volume chain 240A-240F associated with the disk image 210 to determine which volumes, if any, are part of a VM snapshot. In some implementations, the snapshot integrity manager 117 can determine if the volume is part of a VM snapshot using the metadata file associated with that volume. For example, the snapshot integrity manager 117 may determine that the volume is part of a "VM" snapshot according the configuration of the VM snapshot. This configuration contains the VM configuration at the time the snapshot was taken. In should be noted that the VM configuration mentioned may contain only a subset of the VM configuration that is required for the VM 130A to boot. The VM configuration, however, associated with the snapshot contains memory from the operating system point-of-view for the VM 130A to be restored properly. If there a no snapshot volumes in the volume chain, the disk image 210 can be simply deleted. If there are snapshots in the volume chain, the snapshot integrity manager 117 may update certain configuration information (e.g., metadata 250 and data 254) associated with the snapshot volumes in order to move them to the empty disk image 260.

To move the snapshot volumes associated with the disk image 201, each snapshot volume is isolated from an active volume associated with the virtual machine 130A. For example, the active volume may be a recently created volume that is currently writeable, and thus is not part of any snapshot for the virtual machine 130A. In some implementations, the VM snapshot integrity manager 117 isolates the snapshot volumes by assigning each volume a new identifier associated with a different disk than the disk associated with the active volume. For example, the unique identifier associated with each snapshot volume is update to a new identifier associated with the empty disk image 260. The virtualization manager 110 may add these new identifiers for the snapshot volumes of disk image 210 to the metadata file associated with the empty disk image 206. An advantage of updating the configuration information of the snapshot volumes is that it is not necessary to psychically move or copy data associated with these volumes to the empty disk image. Instead, the configuration information of the snapshot volumes is updated so that old identifiers for the snapshot volumes are replaced with new identifiers that are part of the empty disk image 260 that is used as a placeholder.

In some implementations, the snapshot integrity manager 117 may further update the configuration information of the snapshot volumes by updating the data files 254 associated with the volumes. For example, the snapshot integrity manager 117 may instruct the virtualization manager 110 to iterate over data files 254 associated with each of the isolate volumes of the disk image 210 and update each of them to point to the empty disk image 260. The virtualization manager 110 may then attach the empty disk image 260 to virtual machine 130A, for example, by create a virtual disk to the image at the virtual machine 130A.

After the empty disk image 260 is attached to the virtual machine 130A, the original disk image 210 can be deleted. For example, the virtualization manger 110 may delete a virtual disk associated with the disk image from the virtual machine 130A. As such, from the perspective of the virtual machine 130A it appears as if the original disk image 210 has been deleted. In one implementation, the virtualization manger 110 can recycle or otherwise reassign an identifier for the disk image 210 to another the virtual machine. The empty disk image 240 can now be accessed by the virtual machine 130A in order to access data from a snapshot volume, such as volume 240A-240C that were associated with the deleted disk image.

In order to take a VM snapshot of the virtual machine 130A, the virtualization manager 110, in some instances, may save disk configure data 252 that includes a snapshot of each disk associated with the VM 130A (or only some disk if it was configured to exclude some disk from the snapshot). The disk configure data 252 contains data to restore the disk image associated with the snapshots. In some situations, if the virtual machine 130A is running at the time the snapshot is executed, the snapshot may also contain a snapshot of a virtual memory image (e.g., VM data in volatile memory) associated with the virtual machine 130A. In this case, the virtualization manager 110 stores the virtual memory in one file and the extended VM configuration data 255 is stored in a different configuration file. This extended VM configuration data 255 contains information to restore and use the VM saved virtual memory. These files are represented as (raw) disks to the virtualization manager 110. The disk configuration data 252 and extended VM configuration data 255 may be saved, for example, in different configuration files at the storage domain 160A.

To further assist in maintaining consistency of the VM snapshots, the VM snapshot integrity manager 117 instructs virtualization manager 110 to update the disk configuration data 252 associated with disk image 210 to point to the empty disk image. This is so that the disk configuration data 252 may be used to restore the disk image associated with the snapshot volumes 240A-2040C. The VM snapshot integrity manager 117, in some implementations, can also determine whether a VM snapshot comprises virtual memory by examining the disks represented to the virtualization manager 110. If the VM snapshot integrity manager 117 determines that the VM snapshot includes a virtual memory image, it may instruct the virtualization manager 110 to update the configuration file associated with the extended VM configuration data 255 of the virtual memory image. For example, the virtualization manager 110 may update to the configuration file to point to the empty disk image 260 that is used as a place holder for the snapshots associated with the deleted disk.

Figure 3:
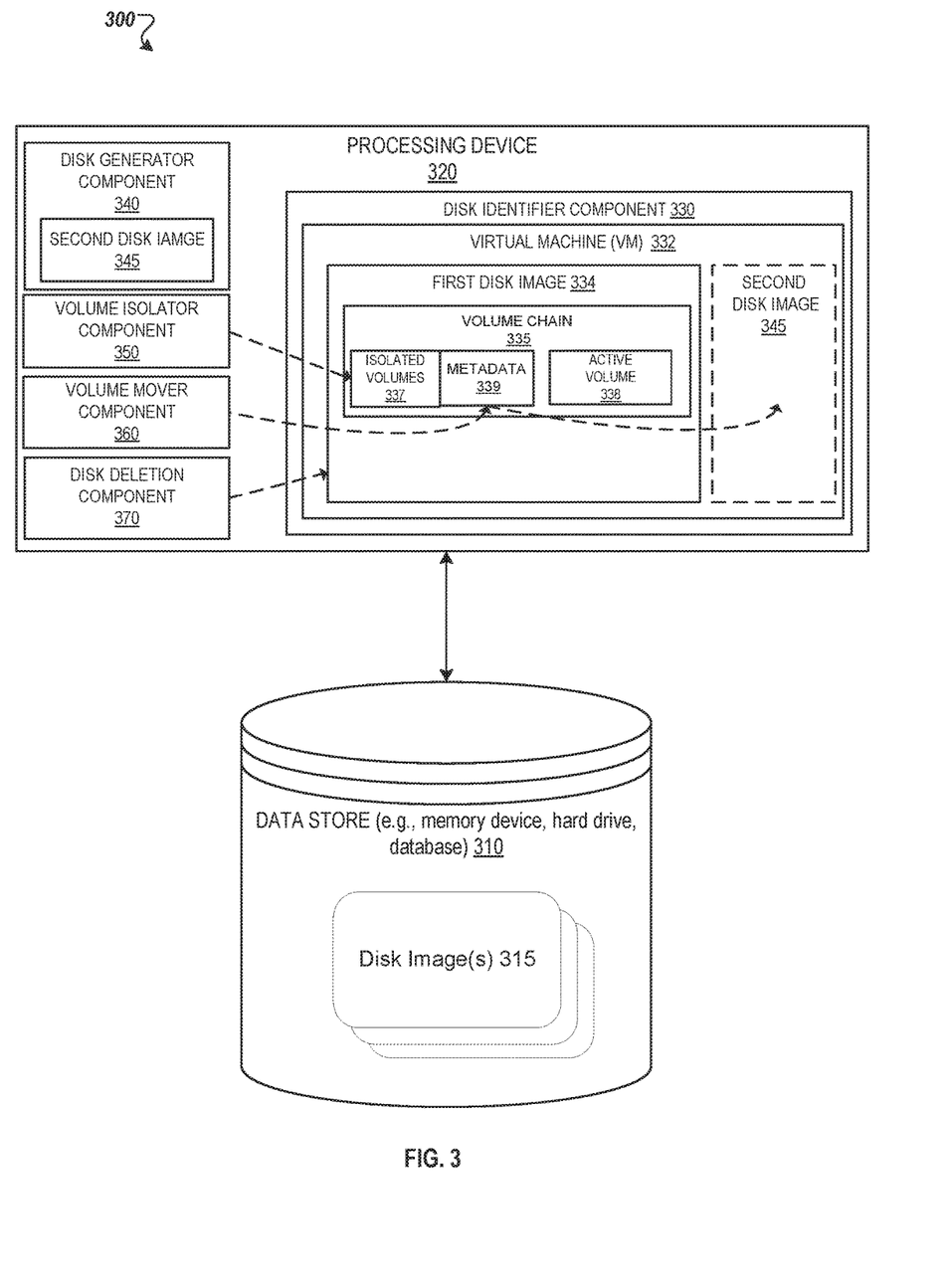
FIG. 3 is a block diagram of a system including a memory for deleting disks while maintaining snapshot consistency in a virtualized data-center according to an implementation of the disclosure.

FIG. 3 is a block diagram of a system 300 including a memory 310 according to an implementation of the disclosure. System 300 may include components and modules for deleting disks while maintaining snapshot consistency by using a placeholder disk image that comprises snapshots of a deleted disk. In some implementations, the system 200 may include a data store 310 (which may be compared to the storage device 160A of FIG. 1) and a processing device 320 coupled to the data store 310. In some implementations, the processing device 320 may execute instructions for carrying out the operations of the modules as discussed herein. As shown, these modules may include a disk identifier component 330, a disk generator component 340, volume isolator component 350, volume mover component 360, and a disk delegation component 370 to delete a disk image from a virtual machine.

Data store 310 may include any non-persistent data storage (e.g., memory), persistent data storage (e.g., flash storage, hard drive, tape), other medium, or combination thereof that is capable of storing instructions for carrying out the operations of the components and module discussed herein. In some implementations, the data store 210 may store disk images 315 and relevant information associated with those images. Each disk image may be associated with a virtual machine. In some implementations, the disk images 315 in the data store 310 may be deleted from the virtual machine. For example, the disk image 315 may be deleted in response to a user request (e.g., system administrator or client user) because it is no longer used by the virtual machine.

The disk identifier component 330 identifies a first virtual disk image 335 associated with a virtual machine (VM) 332 to be deleted. For example, the VM snapshot integrity manager 117 may identify the first virtual disk image 335 as a disk image that virtualization manager 110 has targeted for deletion. In some implementations, the first virtual disk image 330 includes one or more volumes in a volume chain 335. Each volume in the volume chain 335 is associated with a metadata file 339. For example, the metadata file 339 stores information that may be utilized for identification, management, creation, modification, removal, and/or for performing other operations with respect to the corresponding volume.

The disk generator component 340 may generate a second virtual disk image 345 in response to the first virtual disk image being identified for deletion. For example, the VM snapshot integrity manager 117 sends a request to the virtualization manager 110 to generate the second virtual disk image 345. This second disk is used as a placeholder disk to store snapshot volumes associated with the first virtual disk image 335 that is to be deleted.

The volume isolator component 350 isolates volumes 337 in the volume chain 335 from an active volume 338 associated with first virtual disk image 335. This is that so the isolated volumes 337 can be moved to the second virtual disk image 345. In this regard, the isolated volumes 338 are associated with a snapshot of the first virtual disk image 335. To isolate the volumes, the VM snapshot integrity manager 117 may iterate over volumes in the volume chain 335 associated with the first virtual disk image 335 to determine which volumes are in the snapshot. For example, the VM snapshot integrity manager 117 may examine the metadata 339 associated with each of the volumes to identify the snapshot volumes.

The volume mover component 360 moves the isolated volumes 337 from the first disk image 334 to the second disk image 345 by updating the metadata file 339 associated with each of the isolated volumes 337. For example, the isolated volumes 337 of the first virtual disk image 334 are updated to point to the second virtual disk image 345. To point the isolated volumes 338 to the second virtual disk image 345, the volume mover module 360 updates or changes a first volume identifier in the metadata 339 associated with each of the isolated volumes 337 to a second volume identifier associated with the second virtual disk image 345.

The disk deletion component 370 deletes the first disk image 334 from the VM 332. For example, the virtual machine manager may delete a virtual disk associated with the first disk image 334 from the VM 332. Hence, from the perspective the virtual machine 332, the first virtual disk image 335 appears deleted. The virtualization manger 117 can then recycle an identifier associated with the first disk image 334 and remap that identifier to another virtual machine.

Figure 4:
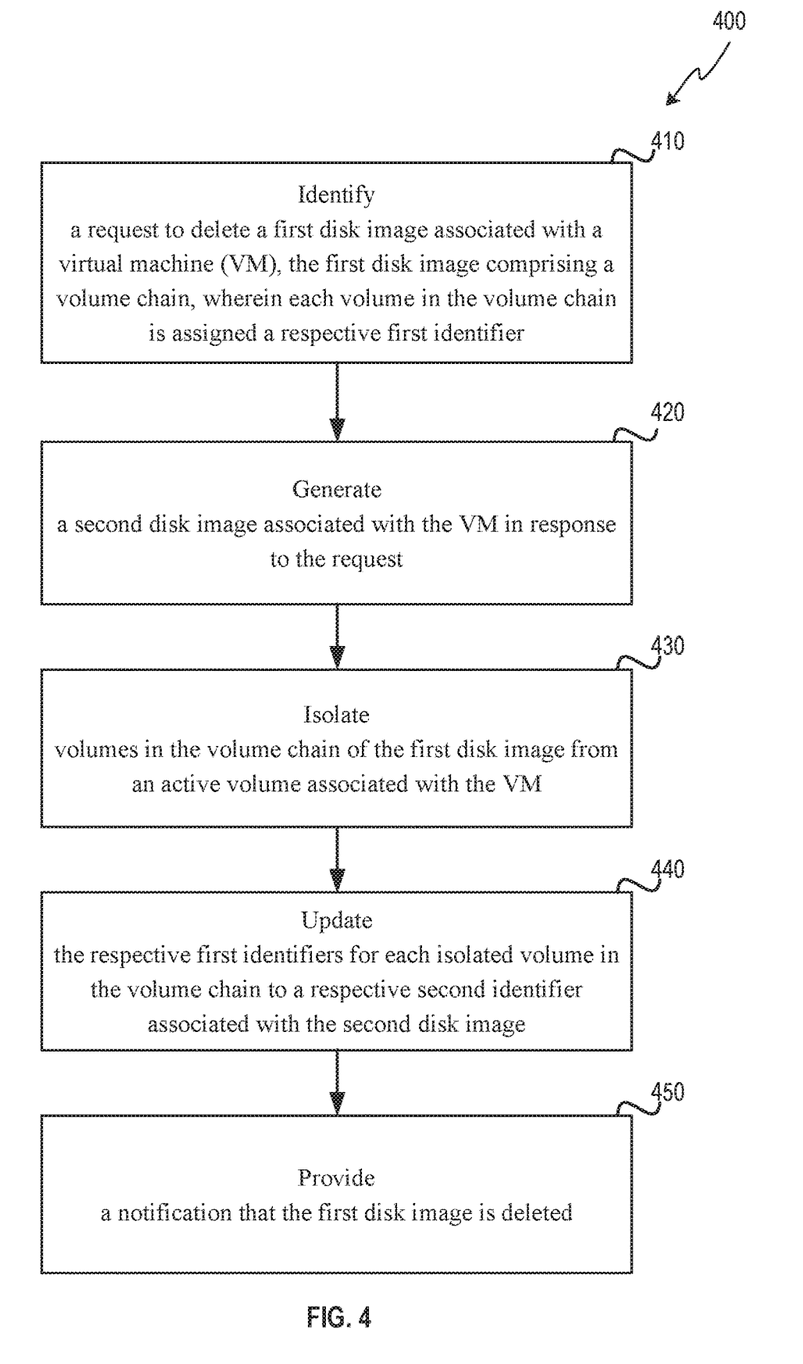
FIG. 4 illustrates a flow diagram illustrating a method of deleting disks while maintaining snapshot consistency in a virtualized data-center according to an implementation of the disclosure.

FIG. 4 depicts a flow diagram of one implementation of a method 400 in accordance with one or more aspects of the disclosure. In one implementation, the processing device 320 of FIG. 3 may perform method 400 to delete disks while maintaining snapshot consistency in a virtualized data-center. The method 400 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 400 and each of its individual functions. In certain implementations, a single processing thread may perform method 400. Alternatively, two or more processing threads with each thread executing one or more individual functions, routines, subroutines, or operations may perform method 400. It should be noted that blocks of method 400 depicted in FIG. 4 can be performed simultaneously or in a different order than that depicted.

Method 400 being in block 410 where a request to delete a first disk image associated with a virtual machine (VM) is identified. The first disk image comprising a volume chain where each volume in the volume chain is assigned a respective first identifier. In block 420, a second disk image associated with the VM in response to the request. In block 430, one or more volumes in the volume chain of the first disk image are isolated from an active volume associated with the VM. The respective first identifier for each isolated volume in the volume chain is updated to a respective second identifier associated with the second disk image in block 440. Thereupon, a notification is provide in block 450 that the first disk image is deleted.

Figure 5:
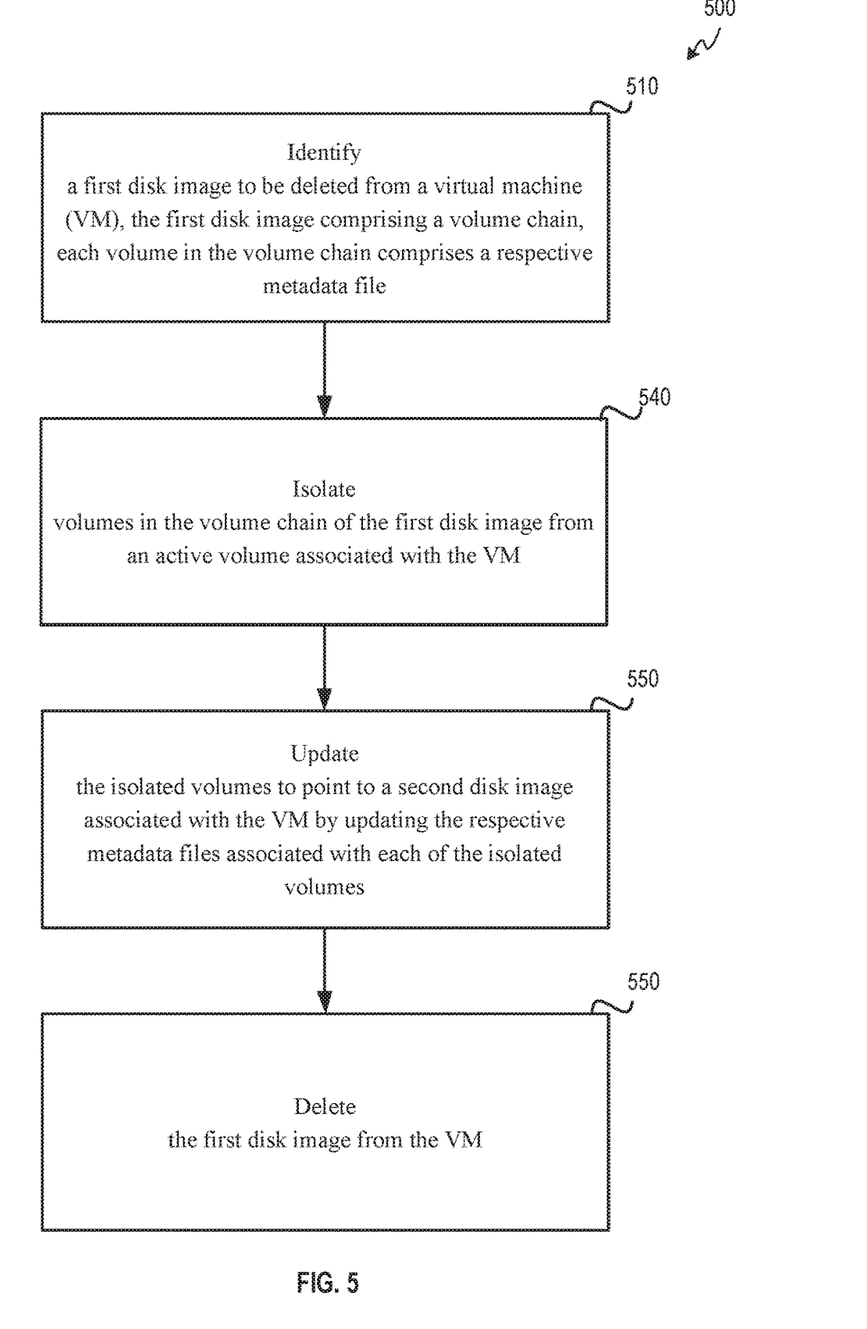
FIG. 5 illustrates a flow diagram illustrating another method of deleting disks while maintaining snapshot consistency in a virtualized data-center according to an implementation of the disclosure.

FIG. 5 depicts a flow diagram of one implementation of another method 500 in accordance with one or more aspects of the disclosure. In one implementation, the processing device 320 of FIG. 3 may perform method 500 to delete disks while maintaining snapshot consistency in a virtualized data-center. The method 500 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 500 and each of its individual functions. In certain implementations, a single processing thread may perform method 500. Alternatively, two or more processing threads with each thread executing one or more individual functions, routines, subroutines, or operations may perform method 500. It should be noted that blocks of method 500 depicted in FIG. 5 can be performed simultaneously or in a different order than that depicted.

Method 500 being in block 410 where a first disk image to be deleted from a virtual machine (VM) is identified. The first disk image comprising a volume chain. Each volume in the volume chain comprises a respective metadata file. In block 420, one or more volumes in the volume chain of the first disk image are isolated from an active volume associated with the VM. The isolated volumes are updated to point to a second disk image associated with the VM by updating the respective metadata files associated with each of the isolated volumes in block 430. Thereafter, the first disk image is deleted from the VM in block 440.

Figure 6:
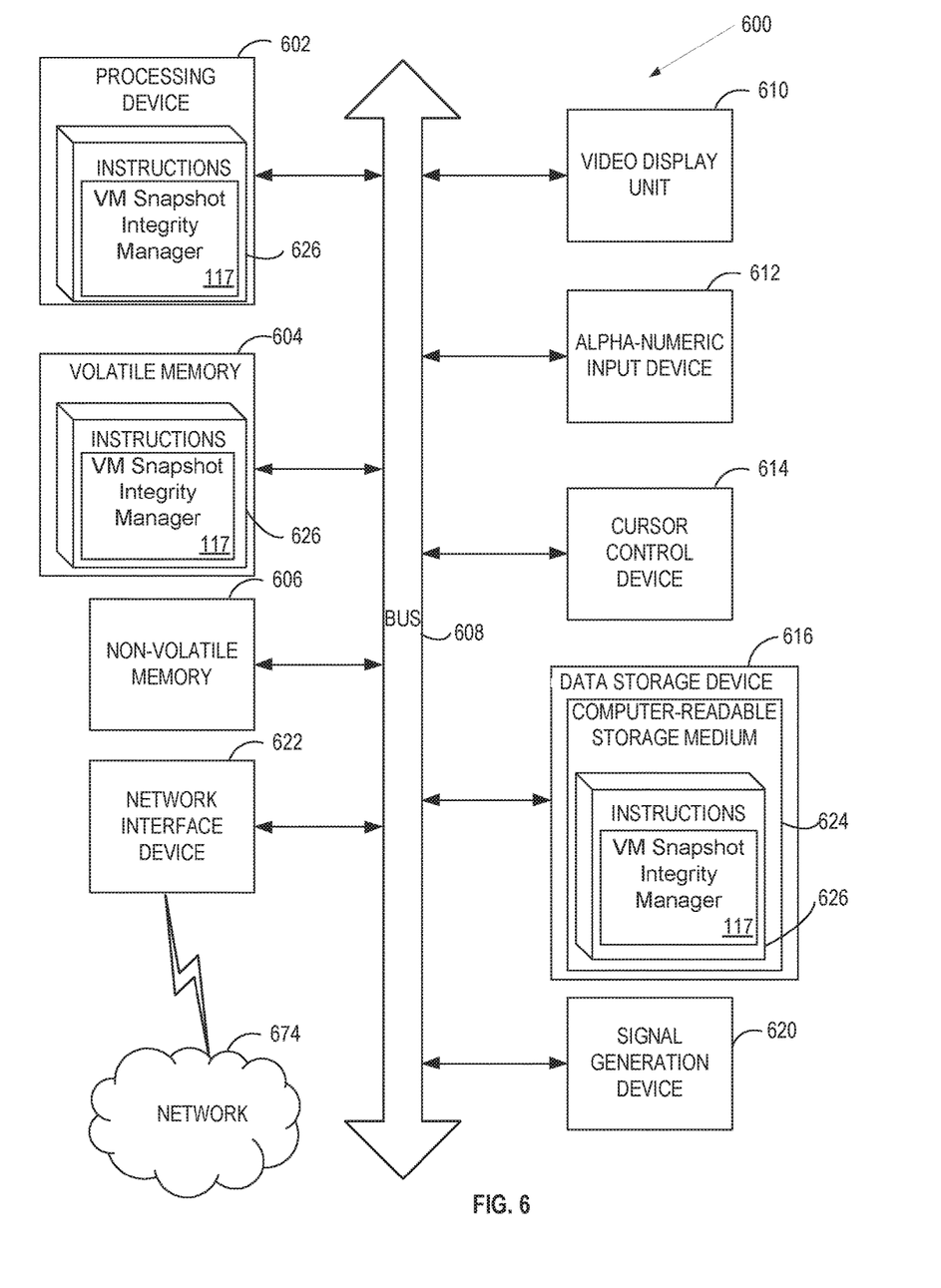
FIG. 6 illustrates a block diagram illustrating a computer system in which implementations of the disclosure may be used.

FIG. 6 depicts a block diagram of a computer system operating in accordance with one or more aspects of the disclosure. In various illustrative examples, computer system 600 may correspond to a processing device within system 100, system 200, or system 300 of FIG. 1, FIG. 2 and FIG. 3 respectively. The computer system may be included within a data center that supports virtualization. Virtualization within a data center results in a physical system being virtualized using virtual machines to consolidate the data center infrastructure and increase operational efficiencies.

A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding the VM snapshot integrity manager 117 of FIG. 1 for implementing method 400 of FIG. 4 or method 500 of FIG. 5 for deleting disks while maintaining snapshot consistency in a virtualized data-center.

Instructions 626 may also reside, completely or partially, within volatile memory 604 and/or within processing device 602 during execution thereof by computer system 600, hence, volatile memory 604 and processing device 602 may also constitute machine-readable storage media.

While non-transitory computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "determining," "isolating," "updating," "linking," "generating," "marking," "moving" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500, and/or each of its individual functions, routines, subroutines, or operations. Examples of the structure for a variety of these systems are set forth in the description above.

It is to be understood that the above description is intended to be illustrative, and not restrictive. Many other implementation examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:
a memory to store disk images; and
a processing device, operatively coupled to the memory, to:
identify a first disk image comprising a volume chain, each volume in the volume chain comprising a respective metadata file and assigned a respective first identifier associated with the first disk image, wherein the identified first disk image is to be deleted from a virtual machine (VM);
responsive to identifying the first disk image, generate a second disk image associated with the VM;
determine whether one or more volumes in the volume chain are part of a virtual machine snapshot of the VM;
in response to determining that one or more volumes in the volume chain are part of the virtual machine snapshot of the VM, isolate the one or more volumes in the volume chain of the first disk image from an active volume in the volume chain that is not part of the virtual machine snapshot by assigning each of the one or more volumes present on the first disk image a respective second identifier associated with the second disk image;
move the isolated volumes from the first disk image to the second disk image by updating the respective metadata file associated with each of the isolated volumes; and
delete the first disk image from the VM.

2. The system of claim 1, wherein the processing device is further to:
determine whether the virtual machine snapshot of the VM comprises a virtual memory image; and
update an extended configuration file associated with the virtual memory image to point to the second disk image in view of the determination.

3. The system of claim 1, wherein to move, the processing device is further to update each of the isolated volumes associated with the first disk image to point to a virtual disk associated with the second disk image.

4. The system of claim 3, wherein the processing device is further to update a first volume identifier for each of the isolated volumes to a second volume identifier associated with the second disk image.

5. The system of claim 1, wherein the processing device is further to update a disk configuration file associated with the first disk image to point to the second disk image.

6. The system of claim 1, wherein to delete the first disk image from the VM, the processing device is further to delete a virtual disk associated with the first disk image from the VM.

7. The system of claim 1, wherein the active volume is writable.

8. A method comprising:
identifying a request to delete a first disk image associated with a virtual machine (VM), the first disk image comprising a volume chain, wherein each volume in the volume chain is assigned a respective first identifier associated with the first disk image;
responsive to the request, generating, by a processing device, a second disk image associated with the VM;
determining whether one or more volumes in the volume chain are part of a virtual machine snapshot of the VM;
in response to determining that one or more volumes in the volume chain are part of the virtual machine snapshot of the VM, isolating, by the processing device, the one or more volumes in the volume chain of the first disk image from an active volume in the volume chain that is not part of the virtual machine snapshot, wherein isolating the one or more volumes comprises updating the respective first identifier for each of the isolated volumes present on the first disk image
to a respective second identifier associated with the second disk image; and
providing a notification that the first disk image is deleted.

9. The method of claim 8, further comprising:
determining whether the virtual machine snapshot of the VM comprises virtual memory image; and
updating an extended configuration file associated with the virtual memory image to point to the second disk image in view of the demined.

10. The method of claim 8, further comprising updating each of the isolated volumes associated with the first disk image to point to a virtual disk associated with the second disk image.

11. The method of claim 8, further comprising updating a metadata file for each of the isolated volumes in view of the respective second volume identifier associated with the second disk image.

12. The method of claim 8, further comprising updating a disk configuration file associated with the first disk image to point to the second disk image.

13. The method of claim 8, further comprising providing a request to delete a virtual disk associated with the first disk image from the VM.

14. The method of claim 8, wherein the active volume is writable.

15. A non-transitory computer-readable storage medium comprising instructions that when executed, by a processing device, cause the processing device to:
identify, by the processing device, a first disk image to be deleted from a virtual machine (VM), the first disk image comprising a volume chain, each volume in the volume chain comprising a respective metadata file and assigned a respective first identifier associated with the first disk image;
determine whether one or more volumes in the volume chain are part of a virtual machine snapshot of the VM;
in response to determining that one or more volumes in the volume chain are part of the virtual machine snapshot of the VM, isolate the one or more volumes in the volume chain of the first disk image from an active volume in the volume chain that is not part of the virtual machine snapshot by assigning each of the one or more volumes present on the first disk image a respective second identifier associated with a second disk image; and
update the isolated volumes to point to the second disk image associated with the VM by updating the respective metadata file associated with each of the isolated volumes; and
delete the first disk image from the VM.

16. The non-transitory computer-readable storage medium of claim 15, wherein the processing device is further to:
determine whether the snapshot of the VM comprises virtual memory image; and
update an extended configuration file associated with the virtual memory image to point to the second disk image in view of the determination.

17. The non-transitory computer-readable storage medium of claim 15, wherein the processing device is further to update a first volume identifier identified in the metadata file for each of the isolated volumes to a second volume identifier associated with the second disk image.

18. The non-transitory computer-readable storage medium of claim 15, wherein the processing device is further to update a disk configuration file associated with the first disk image to point to the second disk image.

19. The non-transitory computer-readable storage medium of claim 15, wherein to delete the first disk image from the VM, the processing device is further to provide a request to delete a virtual disk associated with the first disk image from the VM.

20. The non-transitory computer-readable storage medium of claim 15, wherein the active volume is writable.

* * * * *